United States Patent

Lankewicz et al.

[11] Patent Number: 6,054,104
[45] Date of Patent: *Apr. 25, 2000

[54] METHOD AND APPARATUS FOR GERMANIUM RECLAMATION FROM CHEMICAL VAPOR DEPOSITION

[75] Inventors: David W. Lankewicz, Hickory; Bruce D. Reilly, Raleigh, both of N.C.

[73] Assignee: Alcatel, Paris, France

[*] Notice: This patent issued on a continued prosecution application filed under 37 CFR 1.53(d), and is subject to the twenty year patent term provisions of 35 U.S.C. 154(a)(2).

[21] Appl. No.: 09/007,296

[22] Filed: Jan. 14, 1998

Related U.S. Application Data

[60] Provisional application No. 60/035,199, Jan. 14, 1997.

[51] Int. Cl.⁷ .................................................. C01G 17/00
[52] U.S. Cl. ................................................. 423/92; 423/93
[58] Field of Search ........................... 423/92, 93; 65/413

[56] References Cited

U.S. PATENT DOCUMENTS

| | | |
|---|---|---|
| 2,827,361 | 3/1958 | Lebedeff et al. . |
| 2,929,677 | 3/1960 | Alf et al. . |
| 4,367,085 | 1/1983 | Suto et al. . |
| 4,385,915 | 5/1983 | Amelse et al. . |
| 4,554,078 | 11/1985 | Huggins et al. ..................... 210/749 |
| 4,578,253 | 3/1986 | Gill et al. . |

FOREIGN PATENT DOCUMENTS

| | | |
|---|---|---|
| 0750935 | 1/1997 | European Pat. Off. . |
| 3143958 | 5/1983 | Germany . |

*Primary Examiner*—Steven Bos
*Attorney, Agent, or Firm*—Ware, Fressola, Van Der Sluys & Adolphson LLP

[57] ABSTRACT

A continuous system recovers germanium (Ge) from a chemical vapor deposit. A chemical vapor deposit scrubber scrubs a chemical vapor deposit to form a chemical vapor deposit scrubber solution. An equalization and neutralization mixer adds a caustic soda to the chemical vapor deposit scrubber solution to form an equalization and neutralization mixer solution having a pH above 12.0 to maintain the solubility of silicon oxide ($SiO_2$) and hypochlorite ($ClO^-$). A hypochlorite reduction mixer adds a peroxide to the equalization and neutralization solution to form a hypochlorite reduction solution to reduce hypochlorites. A precipitant and neutralization mixer adds a metal cation such as Epsom Salts ($MgSO_4$) and a caustic soda, such as sodium hydroxide (NAOH), to the hypochlorite reduction solution to form a precipitant and neutralization solution to precipitate magnesium germanate ($MgGeO_3$) and magnesium metasilicate ($MgSiO_3$). A reactor tank adds a polymer to the precipitant and neutralization solution to flocculate the germanium (Ge) and silicon (Si) solids and form a flocculation solution. A plate clarifier collects the flocculation solution to form a flocculated material. A filter press and the dryer produces a dry sludge of germanium (Ge) within a range of 5%–10% by weight.

15 Claims, 7 Drawing Sheets

| Bag Number | Net Weight kg | Net Weight lbs | Dry Weight lbs | Dry % Ge | % moisture | Germanium kg | Estimated GeCl4 (Kg) 6.25% Ge @40%Moisture | EP Amount of GeCl4 kg |
|---|---|---|---|---|---|---|---|---|
| ATC-001-1 | 186 | 410.06 | 270.6 | 6.12 | 34 | 7.51 | 17.93 | 22.19 |
| 2 | 205.3 | 452.60 | 377.9 | 6.73 | 16.5 | 11.54 | 19.79 | 34.07 |
| 3 | 197.55 | 435.52 | 395.9 | 7.02 | 9.1 | 12.61 | 19.04 | 37.23 |
| 4 | 186.95 | 412.15 | 263.8 | 5.98 | 36 | 7.15 | 18.02 | 21.13 |
| 5 | 238.5 | 525.80 | 307.1 | 7.2 | 41.6 | 10.03 | 22.99 | 29.62 |
| 6 | 204.85 | 451.61 | 271.4 | 8.45 | 39.9 | 10.40 | 19.75 | 30.73 |
| 7 | 186.75 | 411.71 | 167.6 | 8.22 | 59.3 | 6.25 | 18.00 | 18.45 |
| 8 | 222.35 | 490.19 | 219.6 | 8.2 | 55.2 | 8.17 | 21.43 | 24.13 |
| 9 | 246.55 | 543.54 | 256.6 | 8.21 | 52.8 | 9.55 | 23.77 | 28.22 |
| 10 | 284.7 | 627.65 | 244.2 | 8.1 | 61.1 | 8.97 | 27.45 | 26.50 |
| 11 | 229.05 | 504.96 | 165.6 | 7.92 | 67.2 | 5.95 | 22.08 | 17.57 |
| 12 | 230.9 | 509.04 | 366.5 | 5.76 | 28 | 9.58 | 22.26 | 28.28 |
| 13 | 280.1 | 617.51 | 396.4 | 4.23 | 35.8 | 7.61 | 27.00 | 22.47 |
| ATC-002-1 | 315.9 | 696.43 | 527.9 | 4.63 | 24.2 | 11.09 | 30.45 | 32.74 |
| 2 | 332.65 | 733.36 | 477.4 | 5.48 | 34.9 | 11.87 | 32.07 | 35.05 |
| 3 | 347.5 | 766.10 | 421.4 | 5.61 | 45 | 10.72 | 33.50 | 31.67 |
| 4 | 296.3 | 653.22 | 405.0 | 5.94 | 38 | 10.91 | 28.56 | 32.23 |
| ATC-003-1 | 242.45 | 534.51 | 274.7 | 6.5 | 48.6 | 8.10 | 23.37 | 23.92 |
| 2 | 253.6 | 559.09 | 305.3 | 7.52 | 45.4 | 10.41 | 24.45 | 30.75 |
| 3 | 271.25 | 598.00 | 371.4 | 7.14 | 37.9 | 12.03 | 26.15 | 35.52 |

FIG. 3A

| Bag Number | Net Weight kg | Net Weight lbs | Dry Weight lbs | Dry % Ge | % moisture | Germanium kg | Estimated GeCl4 (Kg) 6.25% Ge @40%Moisture | EP Amount of GeCl4 kg |
|---|---|---|---|---|---|---|---|---|
| 4 | 226.8 | 500.00 | 273.0 | 6.92 | 45.4 | 8.57 | 21.86 | 25.31 |
| ATC-004-1 | 218.2 | 481.04 | 337.7 | 7 | 29.8 | 10.72 | 21.03 | 31.67 |
| 2 | 232.3 | 512.13 | 355.4 | 6.2 | 30.6 | 10.00 | 22.39 | 29.52 |
| 3 | 340.65 | 751.00 | 431.1 | 5.07 | 42.6 | 9.91 | 32.84 | 29.28 |
| 4 | 343.55 | 757.39 | 434.7 | 5.49 | 42.6 | 10.83 | 33.12 | 31.98 |
| ATC-005-1 | 370.5 | 816.80 | 326.7 | 5.4 | 60 | 8.00 | 35.72 | 23.64 |
| 2 | 298.65 | 658.40 | 312.7 | 4.55 | 52.5 | 6.45 | 28.79 | 19.06 |
| 3 | 298.8 | 658.73 | 330.7 | 4.9 | 49.8 | 7.35 | 28.80 | 21.71 |
| ATC-006-1 | 270.55 | 596.45 | 295.8 | 5.94 | 50.4 | 7.97 | 26.08 | 23.54 |
| 2 | 266.7 | 587.97 | 267.5 | 5.92 | 54.5 | 7.18 | 25.71 | 21.22 |
| 3 | 266 | 586.42 | 248.6 | 5.72 | 57.6 | 6.45 | 25.64 | 19.05 |
| ATC-007-1 | 298.9 | 658.95 | 303.8 | 5.86 | 53.9 | 8.07 | 28.81 | 23.85 |
| 2 | 243.55 | 536.93 | 285.1 | 5.61 | 46.9 | 7.26 | 23.48 | 21.43 |
| 3 | 302.75 | 667.44 | 314.4 | 4.93 | 52.9 | 7.03 | 29.19 | 20.76 |
| ATC-008-1 | 276.6 | 609.79 | 299.4 | 5.92 | 50.9 | 8.04 | 26.66 | 23.75 |
| 2 | 225.25 | 496.59 | 279.6 | 5.76 | 43.7 | 7.30 | 21.71 | 21.57 |
| 3 | 261.85 | 577.27 | 325.6 | 5.14 | 43.6 | 7.59 | 25.24 | 22.42 |
| 4 | 221.7 | 488.76 | 266.9 | 5.34 | 45.4 | 6.46 | 21.37 | 19.09 |
| 5 | 263.95 | 581.90 | 329.4 | 4.54 | 43.4 | 6.78 | 25.44 | 20.03 |
| ATC-009-1 | 249.55 | 550.16 | 261.9 | 4.55 | 52.4 | 5.40 | 24.06 | 15.96 |
| 2 | 279.05 | 615.19 | 262.7 | 4.7 | 57.3 | 5.60 | 26.90 | 16.54 |

FIG. 3B

| Bag Number | Net Weight kg | Net Weight lbs | Dry Weight lbs | Dry % Ge | % moisture | Germanium kg | Estimated GeCl4 (Kg) 6.25% Ge @40%Moisture | EP Amount of GeCl4 kg |
|---|---|---|---|---|---|---|---|---|
| 3 | 280.6 | 618.61 | 321.7 | 4.6 | 48 | 6.71 | 27.05 | 19.82 |
| ATC-010-1 | 228.15 | 502.98 | 346.0 | 4.56 | 31.2 | 7.16 | 21.99 | 21.14 |
| 2 | 217.6 | 479.72 | 309.4 | 4.8 | 35.5 | 6.74 | 20.98 | 19.90 |
| 3 | 206.15 | 454.48 | 319.0 | 5.41 | 29.8 | 7.83 | 19.87 | 23.12 |
| ATC-011-1 | 251.15 | 553.69 | 366.5 | 5.34 | 33.8 | 8.88 | 24.21 | 26.22 |
| 2 | 249.65 | 550.38 | 290.6 | 4.81 | 47.2 | 6.34 | 24.07 | 18.73 |
| 3 | 245.75 | 541.78 | 340.2 | 4.59 | 37.2 | 7.08 | 23.69 | 20.92 |
| 4 | 256.7 | 565.92 | 429.5 | 4.78 | 24.1 | 9.31 | 24.75 | 27.51 |
| ATC-012-1 | 264.55 | 583.23 | 303.3 | 4.52 | 48 | 6.22 | 25.50 | 18.37 |
| 2 | 284.5 | 627.21 | 345.0 | 5.78 | 45 | 9.04 | 27.43 | 26.71 |
| 3 | 328.25 | 723.66 | 455.2 | 6.61 | 37.1 | 13.65 | 31.64 | 40.31 |
| ATC-013-1 | 320.25 | 706.02 | 431.4 | 7.86 | 38.9 | 15.38 | 30.87 | 45.43 |
| 2 | 278.3 | 613.54 | 402.5 | 7.9 | 34.4 | 14.42 | 26.83 | 42.60 |
| 3 | 317.85 | 700.73 | 501.7 | 8.59 | 28.4 | 19.55 | 30.64 | 57.74 |
| ATC-014-1 | 293.5 | 647.05 | 491.8 | 8.68 | 24 | 19.36 | 28.29 | 57.19 |
| 2 | 325.4 | 717.38 | 512.9 | 8.81 | 28.5 | 20.50 | 31.37 | 60.54 |
| 3 | 303.7 | 669.54 | 504.8 | 7.87 | 24.6 | 18.02 | 29.28 | 53.23 |
| ATC-015-1 | 242.9 | 535.50 | 414.5 | 10.19 | 22.6 | 19.16 | 23.42 | 56.58 |
| 2 | 277.5 | 611.78 | 479.6 | 10.07 | 21.6 | 21.91 | 26.75 | 64.71 |
| 3 | 213.55 | 470.79 | 381.3 | 9.47 | 19 | 16.38 | 20.59 | 48.36 |
| ATC-016-1 | 311.95 | 687.72 | 502.7 | 8.54 | 26.9 | 19.47 | 30.07 | 57.52 |

FIG. 3C

| Bag Number | Net Weight kg | Net Weight lbs | Dry Weight lbs | Dry % Ge | % moisture | Germanium kg | Estimated GeCl4 (Kg) 6.25% Ge @40%Moisture | EP Amount of GeCl4 kg |
|---|---|---|---|---|---|---|---|---|
| 2 | 275.85 | 608.14 | 394.7 | 8.54 | 35.1 | 15.29 | 26.59 | 45.16 |
| 3 | 274.4 | 604.94 | 408.9 | 8.91 | 32.4 | 16.53 | 26.45 | 48.82 |
| ATC-017-1 | 243.2 | 536.16 | 388.2 | 8.95 | 27.6 | 15.76 | 23.44 | 46.54 |
| 2 | 253.2 | 558.20 | 448.2 | 9.04 | 19.7 | 18.38 | 24.41 | 54.29 |
| 3 | 208.4 | 459.44 | 346.9 | 8.93 | 24.5 | 14.05 | 20.09 | 41.50 |
| ATC-018-1 | 207.65 | 389.50 | 234.7 | 7.28 | 30.9 | 10.44 | 17.03 | 20.86 |
| 2 | 241.05 | 393.40 | 237.0 | 7.07 | 32 | 11.58 | 17.20 | 21.07 |
| 3 | 205.3 | 397.33 | 239.4 | 7 | 25.1 | 10.76 | 17.37 | 21.29 |
| ATC-019-1 | 223.05 | 401.31 | 241.8 | 7.02 | 29.9 | 10.97 | 17.54 | 21.50 |
| 2 | 207.25 | 405.32 | 244.2 | 6.22 | 33 | 8.63 | 17.73 | 21.71 |
| 3 | 196.2 | 409.37 | 246.6 | 4.9 | 46.8 | 5.11 | 17.90 | 21.93 |
| ATC-020-1 | 180.1 | 413.17 | 249.1 | 4.28 | 45.5 | 4.20 | 18.07 | 22.15 |
| 2 | 199.55 | 417.60 | 251.6 | 4.04 | 55 | 3.62 | 18.26 | 22.37 |
| 3 | 202.75 | 421.17 | 254.1 | 3.76 | 49.2 | 3.87 | 18.44 | 22.60 |
| ATC-021-1 | 227.35 | 425.99 | 256.6 | 3.7 | 55.3 | 3.76 | 18.62 | 22.82 |
| 2 | 216.45 | 430.25 | 259.2 | 4.24 | 52.5 | 4.35 | 18.81 | 23.05 |
| 3 | 193.35 | 434.55 | 261.8 | 4.38 | 55.4 | 3.77 | 19.00 | 23.28 |
| ATC-022-1 | 188.35 | 438.90 | 264.4 | 4.08 | 49.1 | 3.91 | 19.19 | 23.52 |

FIG. 3D

| Bag Number | Net Weight kg | Net Weight lbs | Dry Weight lbs | Dry % Ge | % moisture | Germanium kg | Estimated GeCl4 (Kg) 6.25% Ge @40%Moisture | EP Amount of GeCl4 kg |
|---|---|---|---|---|---|---|---|---|
| 2 | 176.25 | 443.29 | 267.1 | 3.88 | 42.5 | 3.93 | 19.38 | 23.75 |
| 3 | 162.42 | 447.42 | 269.7 | 3.96 | 41.7 | 3.75 | 19.58 | 23.98 |

| Net Weight kg | Net Weight lbs | Dry Weight | Dry % Ge | % moisture | Germanium in Kg | Estimated GeCl4 (Kg) | EP Amount of GeCl4 |
|---|---|---|---|---|---|---|---|
| 18,948.55 | 41,347.21 | 24,909.18 | 6.55 | 38.90 | 764.03 | 1,807.97 | 2,215.20 |

FIG. 3E

| FIG. 3A |
|---|
| FIG. 3B |
| FIG. 3C |
| FIG. 3D |
| FIG. 3E |

FIG. 3

METHOD AND APPARATUS FOR GERMANIUM RECLAMATION FROM CHEMICAL VAPOR DEPOSITION

This application claims the benefit of U.S. Provisional Application No. 60/035,199, filed Jan. 4, 1997.

FIELD OF INVENTION

The invention provides a method and apparatus for reclaiming germanium (Ge) from chemical vapor deposition (CVD) exhaust.

BACKGROUND OF THE INVENTION

There are many known methods and apparatus for reclaiming germanium (Ge) from chemical vapor deposition (CVD) exhaust.

For example, U.S. Pat. No. 4,385,915 describes a batch process for the removal of germanium (Ge) from an effluent that is the result of processes used for the production of optical components. In the batch process, optical fiber reactors provide effluent to scrubbers, which processes the effluent and provides a basic aqueous output to a moving sandbag filter. A filtered aqueous medium having dissolved germanium is precipitated from a medium provided by the moving sandbag filter by a precipitator by the addition of a precipitating agent such as an aqueous magnesium sulfate solution. The process also includes providing the filtered aqueous medium to a holding tank, where a sodium hydroxide solution is added to bring the pH of the aqueous medium therein to a value of twelve, and recycling a medium back to the scrubbers for reprocessing. One problem with this process is that it is a batch process, and thus not continuous. Another problem is that the basic aqueous output from the scrubber is filtered before being equalized, neutralized, or the hypochlorites are reduced.

Other methods and apparatus for reclaiming germanium (Ge) from chemical vapor deposition (CVD) exhaust include the following: U.S. Pat. No. 2,827,361 describes a method of recovering germanium (Ge) which involves removing dissolved silicon contained in an aqueous solution having dissolved germanium (Ge) therein and having a pH value of at least seven. The method includes the step of adding soluble inorganic aluminum to the solution to precipitate insoluble silicon from the solution. The aqueous solution used is aqueous sodium hydroxide. U.S. Pat. No. 2,929,677 describes a process for recovering germanium (Ge) from zinc oxide fume taken from furnace slag, using an aqueous sodium hydroxide solution to precipitate iron and germanium (Ge). U.S. Pat. No. 4,367,085 describes a method of making optical fiber preforms using glass raw material gases. The apparatus used in the method includes an exhaust gas cleaner to process the gases exiting the exhaust port. The cleaning process apparently includes the use of a water spray and a neutralizer, such as sodium hydroxide (NaOH). U.S. Pat. No. 4,578,253 describes a method of recovering germanium (Ge) from the effluent of a vapor deposition process of making an optical fiber. This patent incorporates methods disclosed in the U.S. Pat. No. 4,385,915. DE Patent No. 3,143,958 describes a method of forming optical fibers which includes steps of reclaiming the gases used as dopants. A water spray and fractional distillation process are used in the method of recovering germanium (Ge) for reuse.

Moreover, FIG. 1 of the present patent application shows a known continuous stirred tank reactor for waste treatment which includes the following steps: Providing a tube exhaust from a CVD lathes to a scrubber having a recirculation pump; scrubbing the tube exhaust and passing liquid waste from the scrubber to a pH neutralization reactor; combining the liquid waste with a polyflow, a water bath and a scrubber overclad, and providing a pH neutralization solution to a settling stage; providing a slurry to a filtration stage, which provides a filtered slurry back to the settling stage; and providing the slurry to a filter press which provides filter cakes for disposing in a landfill.

SUMMARY OF THE INVENTION

The present invention provides a continuous system for recovering germanium (Ge) from a chemical vapor deposit, having a chemical vapor deposit scrubber, an equalization and neutralization mixer, a hypochlorite reduction mixer, a precipitant and neutralization mixer, a reactor tank, a clarifier and a filter press and a dryer.

The chemical vapor deposit scrubber receives a chemical vapor deposit, and scrubs the chemical vapor deposit to form a chemical vapor deposit scrubber solution.

The equalization and neutralization mixer receives the chemical vapor deposit scrubber solution, and adds a caustic soda thereto to form an equalization and neutralization mixer solution having a pH above 12.0 to maintain the solubility of silicon oxide ($SiO_2$) and hypochlorite ($ClO^-$).

The hypochlorite reduction mixer receives the equalization and neutralization mixer solution, and adds a peroxide to the equalization and neutralization solution to form a hypochlorite reduction solution to reduce hypochlorites.

The precipitant and neutralization mixer receives the hypochlorite reduction solution, and adding a metal cation in the form of Epsom Salts ($MgSO_4$), and adds a caustic soda, such as sodium hydroxide (NaOH), to form a precipitant and neutralization solution to aid in the precipitation of magnesium germanate ($MgGeO_3$) and magnesium metasilicate ($MgSiO_3$).

The reactor tank receives the precipitant and neutralization solution, and adds a polymer to the precipitant and neutralization solution to aid in the flocculation of the germanium (Ge) and silicon (Si) solids and to form a flocculation solution. One polymer includes a cationic polymer.

The clarifier receives the flocculation solution for collection to form a flocculated material. The clarifier may include either a plate clarifier or a chevron clarifier.

The filter press and the dryer receives the flocculated material, and processes and drys the flocculated material to produce a dry sludge of germanium (Ge) within a range of 5%–10% by weight.

BRIEF DESCRIPTION OF THE DRAWING

The invention, both as to its organization and manner of operation, may be further understood by reference to a drawing (not drawn to scale) which includes FIG. 1–3 taken in connection with the following description.

FIG. 3 is a recovery data listing showing actual germanium (Ge) percentage and weight as a result of using the process of the present invention.

BEST MODE OF THE INVENTION

Figure 1:
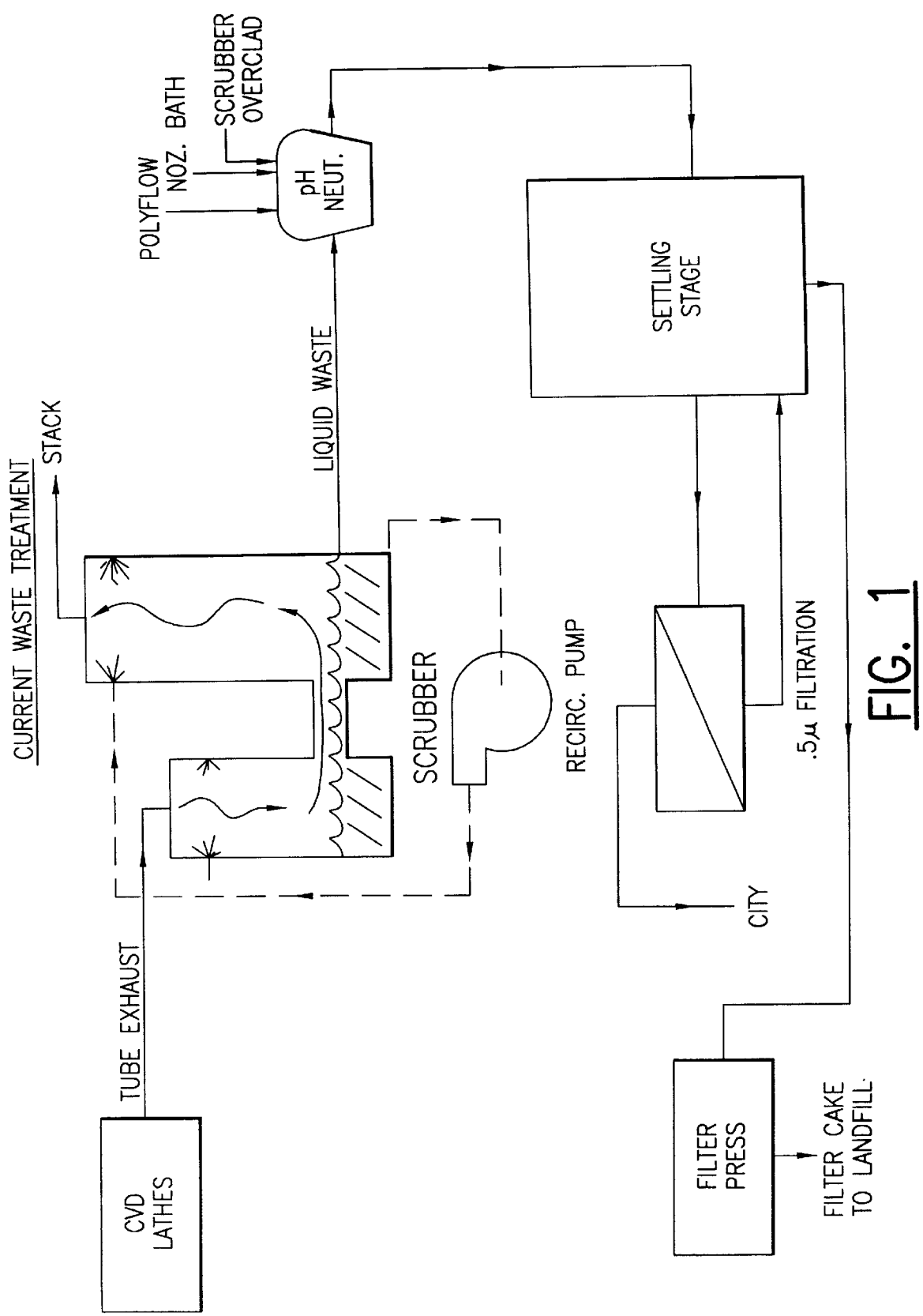
FIG. 1 illustrates a schematic diagram of a known continuous stirred tank reactor for germanium (Ge) reclamation.
Figure 2:
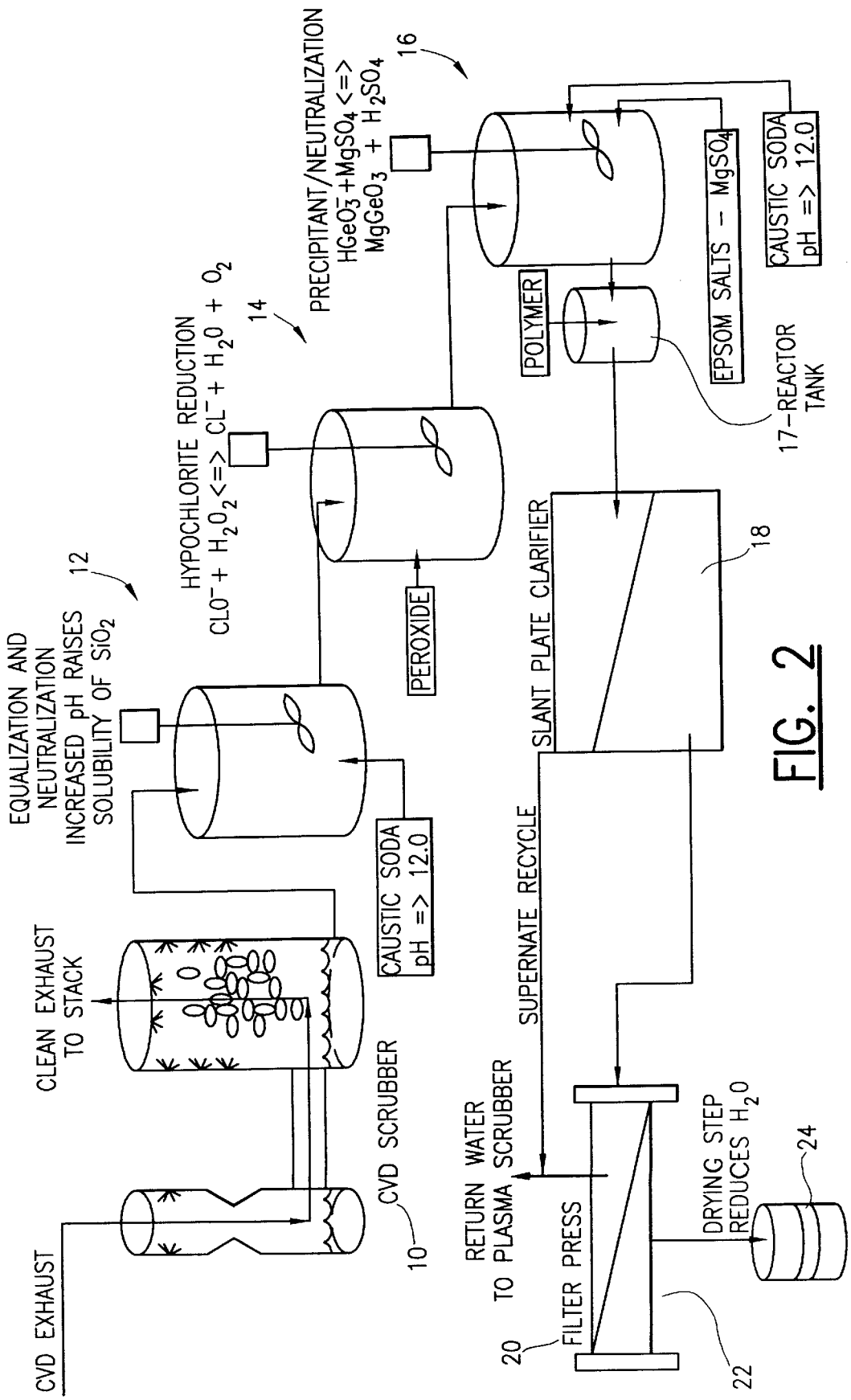
FIG. 2 is a schematic diagram of a continuous stirred tank reactor for germanium (Ge) reclamation which is the subject matter of the present application.

In FIG. 2, an effluent from a modified chemical vapor deposition (MCVD) process for manufacturing optical fiber preforms is directed into a CVD scrubber 10. As shown, the scrubber 10 is a two stage combine venturi and packed bed scrubber having a scrubber overflow sump that is known in the art. It is treated internally to the scrubber with an aqueous solution of sodium hydroxide maintaining a pH above 10.0. The slurry overflow from the scrubber sump is directed to a waste treatment system where it is treated to recover germanium (Ge).

The steps involved in the treatment to participate germanium (Ge) are as follows:

Step 1: Equalization and Neutralization - A CVD scrubber solution is provided from the CVD scrubber 10 to an equalization and neutralization mixer generally indicated as 12, where caustic soda is added to form an equalization and neutralization mixer solution having a pH above 12.0 to maintain the solubility of silicon oxide ($SiO_2$) and hypochlorite ($ClO^-$).

Step 2: Hypochlorite Reduction - The equalization and neutralization solution is provided from the equalization and neutralization mixer 12 to a hypochlorite reduction mixer generally indicated as 14, where a peroxide is added to form a hypochlorite reduction solution to reduce hypochlorites.

Step 3: Precipitant/Neutralization - The hypochlorite reduction solution is provided from the hypochlorite reduction mixer 14 to a precipitant/neutralization mixer generally indicated as 16, where a metal cation in the form of Epsom Salts ($MgSO_4$) is added, and a caustic soda, such as sodium hydroxide (NaOH) is also added, to form a precipitant/ neutralization solution and to aid in the precipitation of magnesium germanate ($MgGeO_3$) (also known as a cationic germanate salt) and Magnesium Metasilicate ($MgSiO_3$) (also known as a cationic metasilicate salt).

Step 4: A polymer such as a cationic polymer is added to the precipitant/neutralization solution in a reactor tank 17 to aid in the flocculation of germanate and metasilicate solids, which are also known in the industry as germanium (Ge) and silicon (Si) solids to form a flocculation solution which is provided to a clarifier 18 such as a plate or chevron clarifier for collection to form flocculated material.

Step 5: The flocculated material is then processed through a filter press 20 and a dryer 22 to produce a dry sludge of germanium (Ge) within a range of 5%–10% by weight which is formed into filter cake 24 for recycling. The drying step reduces the water to a range of 10%–40% by weight, and preferably between a range of 30–40%, and produces filter cakes of germanium (Ge) and results in recovery of germanium (Ge) from the MCVD process. The overall process recovers 98% of the scrubbed germanium (Ge). A maximum solid content of 85% was achieved when operating the dryer 22 at a standard operating temperature of 675 degrees Fahrenheit. When the operating temperature of the dryer 22 is maintained between 575 to 600 degrees, the method provides a maximum yield of germanium.

Step 6: Supernate from a clarifier and excess water from the filter press 20 are recycled and returned to another system, such as an overclad scrubber (not shown).

The scope of the invention is not intended to be limited to only the chemicals shown and described with respect to FIG. 2. For example, embodiments are envisioned in which other reducing agents, such as metabisulites, are used in the Hypochlorite Reduction step.

The following are advantages of the following germanium (Ge) reclamation design:

a) Using a scrubber sump overflow instead of filtration system provides for a continuous process instead of a batch process. The continuous process ensures that a steady, relatively unchanging percentage of germanium (Ge) is flowing into the reclamation system. The scrubber sump acts as a buffer to the many MCVD batch process upstream of the scrubber. Therefore, the final product has substantially a constant percentage of germanium (Ge) by weight. This prevents an extra testing step of the product before shipping to a customer, thereby saving on operating costs and allowing us more pricing leverage with the customer. Secondly, the expensive and difficult step of filtering the scrubber recirculation solution is eliminated.

b) The flocculation step increases filter efficiency. By concentrating the particulate with a flocculation agent, the filtering equipment can be sized smaller and recovers more of the desirable product. Extra filtration steps would be needed if flocculation was not used to recover the same amount of germanium (Ge). Thus, a cost savings is gained by eliminating equipment and operating costs.

c) The drying step reduces operating and shipping costs. The dryer reduces the amount of water $H_2O$ in the product. Thus, the shipping weight is reduced and the product is easier to handle.

d) Waste liquid from the process is of sufficient quality that it can be recycled in other processes or discharged to a sewer without further treatment.

e) Product is directly added to the customer's normal feedstock for $GeCl_4$ production. No further treatment is required. The product has greater than 10–20 times the percentage of germanium (Ge) than the customer's normal feedstock.

FIG. 3 is a recovery data listing showing actual germanium (Ge) percentage and weight.

It is also to be understood that the claims are intended to cover all of the generic and specific features of the invention herein described and all statements of the scope of the invention which, as a matter of language, might be said to fall therebetween.

We claim:

1. A process for recovering germanium from a chemical vapor deposit exhaust, comprising the steps of:

scrubbing the chemical vapor deposit exhaust to form a scrubber solution having gaseous and particulate germanium material and silicon oxide and hypochlorite therein;

equalizing and neutralizing the scrubber solution to form an equalized and neutralized germanium solution having a required pH to maintain the solubility of the silicon oxide and hypochlorite therein;

reducing hypochlorites in the equalized and neutralized germanium solution to form a hypochlorite reduced germanium solution;

precipitating and neutralizing the hypochlorite reduced germanium solution by adding a metal cationic salt to form a precipitated and neutralized solution having a cationic germanate salt and a cationic metasilicate salt therein;

flocculating the precipitated and neutralized solution to aggregate germanate and metasilicate solids therein to form a flocculation solution;

collecting the flocculation solution and forming a flocculated material;

drying the flocculated material to produce a dry sludge of germanium; and forming the dry sludge into filter cakes for recycling.

2. A process according to claim 1, wherein the metal cationic salt is magnesium sulfate;

wherein the cationic germanate salt is magnesium germanate salt; and wherein the cationic metasilicate salt is magnesium metasilicate salt.

3. A process for recovering germanium from a chemical vapor deposit exhaust, comprising the steps of:

scrubbing the chemical vapor deposit exhaust to form a scrubber solution having gaseous and particulate germanium material and silicon oxide and hypochlorite therein;

equalizing and neutralizing the scrubber solution to form an equalized and neutralized germanium solution having a required pH to maintain the solubility of the silicon oxide and hypochlorite therein;

reducing hypochlorites in the equalized and neutralized germanium solution to form a hypochlorite reduced germanium solution;

precipitating and neutralizing the hypochlorite reduced germanium solution by adding magnesium sulfate to form a precipitated and neutralized solution having a magnesium germanate and a magnesium metasilicate therein;

flocculating the precipitated and neutralized solution to aggregate germanate and metasilicate solids therein to form a flocculation solution;

collecting the flocculation solution and forming a flocculated material;

drying the flocculated material to produce a dry sludge of germanium; and forming the dry sludge into filter cakes for recycling.

4. A process according to claim 3, wherein the step of equalizing and neutralizing includes using an equalization and neutralization mixer and providing a caustic soda to the scrubber solution to form the equalized and neutralized germanium solution and maintain the solubility of the silicon oxide and the hypochlorite therein.

5. A process according to claim 4, wherein the equalized and neutralized germanium solution has a pH above 12.0.

6. A process according to claim 3, wherein the step of reducing hypochlorites includes using a hypochlorite reduction mixer and providing a hydrogen peroxide to the equalized and neutralized germanium solution to form the hypochlorite reduced germanium solution.

7. A process according to claim 3, wherein the step of precipitating and neutralizing includes using a precipitant/neutralization mixer and providing a metal cation and a caustic soda to the hypochlorite reduced germanium solution to form the precipitated and neutralized solution.

8. A process according to claim 7, wherein the metal cation is added to aid in the precipitation of the magnesium germanate and the magnesium metasilicate in the precipitated and neutralized solution; and wherein the caustic soda is added to neutralize the precipitated and neutralized solution.

9. A process according to claim 7, wherein the metal cation is Epsom Salts and the caustic soda is sodium hydroxide (NaOH).

10. A process according to claim 3, wherein the step of flocculating includes using a reactor tank for holding the precipitant/neutralization solution and adding a cationic polymer thereto to aggregate the germanate and metasilicate solids to form the flocculation solution.

11. A process according to claim 3, wherein the step of collecting includes using a clarifier, including a plate or chevron clarifier, to form the flocculated material.

12. A process according to claim 3, wherein the step of processing and drying includes using a filter press and a dryer to produce the dry sludge of germanium.

13. A process according to claim 3, wherein the step of collecting includes using a clarifier, including a plate or chevron clarifier, to form the flocculated material; and wherein the step of processing and drying includes using a filter press and a dryer to produce the dry sludge of germanium.

14. A process according to claim 13, wherein the process further comprises the step of recycling and returning supernate from the plate clarifier and excess water from the filter press to another system.

15. A process according to claim 3, wherein the process further comprises the step of running continuously the steps of the process.

* * * * *